United States Patent [19]

Korth et al.

[11] 4,375,655
[45] Mar. 1, 1983

[54] UNIVERSAL DIGITAL DATA COPYING SYSTEM

[75] Inventors: Gerald C. Korth; John J. Gaukel, both of Omaha, Nebr.

[73] Assignee: Memory Control Technology Corporation, Omaha, Nebr.

[21] Appl. No.: 222,178

[22] Filed: Jan. 2, 1981

[51] Int. Cl.³ .............................................. G11B 5/86
[52] U.S. Cl. ...................................................... 360/15
[58] Field of Search ....................... 360/15, 17, 60, 61, 360/62, 91; 235/449, 493, 432, 433, 434, 489; 234/63

[56] References Cited

U.S. PATENT DOCUMENTS

| | | | |
|---|---|---|---|
| 3,535,467 | 10/1970 | Thieme | 360/15 |
| 3,805,284 | 4/1974 | Coon | 360/15 |
| 3,842,245 | 10/1974 | Schneiderhan | 235/489 |
| 4,106,062 | 8/1978 | Foote | 360/15 |
| 4,320,486 | 3/1982 | Cooley | 360/15 |

Primary Examiner—Robert M. Kilgore
Attorney, Agent, or Firm—Zarley, McKee, Thomte, Voorhees & Sease

[57] ABSTRACT

A Universal Digital Data Copying System for the blind copying of digital information from electromagnetic media such as flexible discs is disclosed. The system provides a master drive and a slave drive by which information is read from the master drive, timed by a phase-locked oscillator, converted by a serial to parallel converter, and controlled by a controller and stored in the high speed memory buffer. The output of the controller is fed to a parallel to serial converter and precompensation circuit. Thereupon the information is written at the slave drive at a fixed clock rate. A verifier to test the quality of the recording is also disclosed. By the addition of other drive units, the system provides for any desired number of copies to be made concurrently from a single master. The invention thus provides a copying system independent of the media employed, format or encoding scheme used.

6 Claims, 4 Drawing Figures

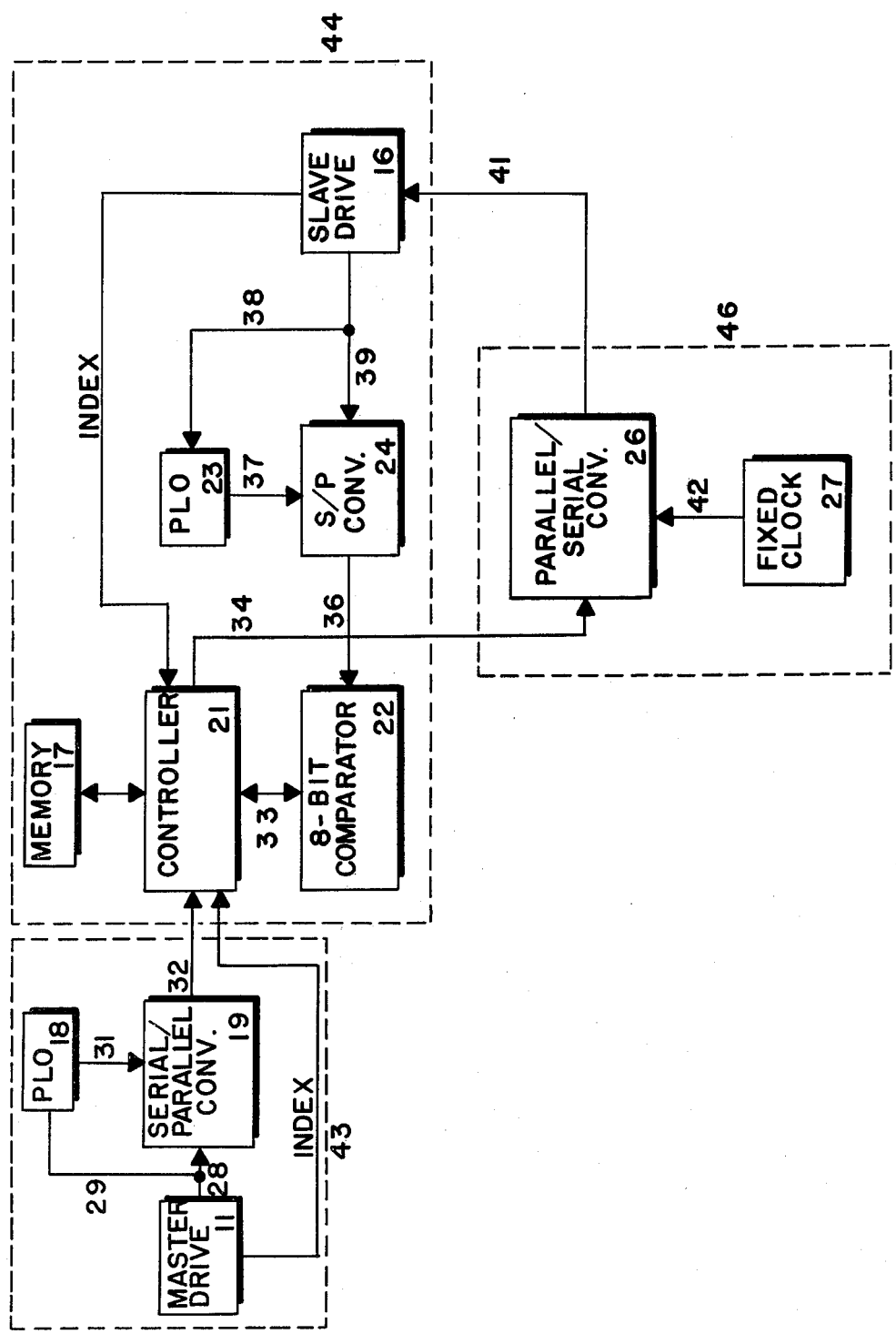

MFM ENCODING

UNIVERSAL DIGITAL DATA COPYING SYSTEM

BACKGROUND OF THE INVENTION

1. Field of the Invention

The present invention in general relates to the copying of digital data from electro-magnetic media, including disc and tape media. In particular, the present invention pertains to a system for the blind copying of data regardless of format or encoding scheme.

2. Prior Art

In the field of magnetic data copying, particularly concerning disc media, the quality of the reproduced data is of prime importance. Many factors contribute to the degredation of the copy, including synchronization errors inherent in the drive units if mechanical synchronization is used.

One common method of copying data fields which requires no mechanical synchronization is to store the entire decoded data field in a buffer memory and then to serially write the data from the buffer memory onto a duplicate disc. The method of duplicating data on disc media thus requires that both the master and the duplicate disc have pre-recorded format information particular to each manufacturer. Generally, the format used requires up to fifty percent of the disc capacity for identification field, address marks and data gaps. Accordingly, the copying of data requires a "prerecorded" or formatted disc and does not allow true "blind copying". The data fields can be copied, but not the format. Currently, most commercially available computer systems are capable of data field copying.

As previously mentioned, another method used to copy data requires electro-mechanical synchronization, so that the spindles of all slave drives are synchronized with the index of master. This method requires no buffer storage, but does introduce synchronization errors and requires expensive precision drives.

Another attempt to continuously duplicate data directly is shown in U.S. Pat. No. 3,805,284 to Coon, Jr., et al. U.S. Pat. No. 3,805,284 teaches an apparatus and method for duplicating and verifying the data utilizing a read/write data synchronizer. The Coons apparatus provides bit to bit data verification via a Data Verifier before being read out. Although U.S. Pat. No. 3,805,284 makes reference to disc media, the apparatus disclosed is more appropriate for transferring data from tape to tape as it is not appropriate for transferring the data from disc to disc as is necessary for the blind copying of disc media. The reason that the device disclosed in U.S. Pat. No. 3,805,284 is not appropriate for disc to disc blind copying is that the device requires a separate read head verifier downstream from the information being copied. Also, the synchronizer works by varying the speed of the drive motors. It thus requires multiple heads and synchronized drives. Although U.S. Pat. No. 3,805,284 made an attempt to continuously duplicate data, the use of a synchronizer approach inherently introduces errors in the copies made thereby and requires considerable drive modification.

The copying of disc information without regard to format and encoding schemes (blind copying) necessitates having a means for insuring that the digital data is written precisely as it was read. Instead of synchronizing the drive units or verifying the data downstream, a better system would provide an electronic clocking mechanism which is governed by the read data itself and an electronically timed buffer output. The present invention provides such a system by utilizing a phase-locked oscillator, buffer memory and a fixed clock. The invention thus eliminates the necessity to encode/decode data, eliminates synchronization errors, utilizes standard drive units and heads, eliminates extra verifying heads and yet provides high quality, continuous high speed copying of data particularly applicable to flexible disc media. While the present invention particularly relates to flexible disc media, due to its universal character, other electro-magnetic media such as optical discs, rigid discs, or tape could also be copied using the system. Additionally, different sized discs could be copied and converted, such as from 5¼" to 8" disc, and likewise from 8" to 5¼". The copying process could also cross media such as from tape to disc, and disc to tape just as easily since the data is timed by the read data itself.

SUMMARY OF THE INVENTION

It is a primary object of this invention to provide a digital data copying system for the blind copying of digital information from electromagnetic media regardless of format or encoding schemes.

It is a further object of the invention to provide a digital data copying system which produces copies at a maximum rate.

It is a further object of the invention to provide a digital data duplication system that allows a steady stream of direct copying.

It is a further object of the invention to provide a digital data duplication system utilizing a phase locked oscillator, a fixed clock and a memory buffer system.

It is a further object of the invention to provide a digital data duplication system which allows multiple copies to be produced concurrently from a single master.

It is a further object of the invention to provide a digital data duplication system which verifies the data being duplicated.

It is a still further object of the invention to provide a Universal Digital Data Copying System that automatically and universally precompensates the flux reversals as required prior to being written on the duplicate disc regardless of encoding scheme.

These and other features and objects are attained according to the instant invention by providing a phase locked oscillator and fixed clock timing circuit in conjunction with a high-speed buffer memory. Copies, particularly flexible disc copies, are consistently produced regardless of format and encoding scheme. All copies are of extremely high quality, although produced at high speed.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a block diagram representation of the digital data duplication system showing the verification phase of the invention, as well as the copy phase.

DESCRIPTION OF THE PREFERRED EMBODIMENTS

Figure 1:
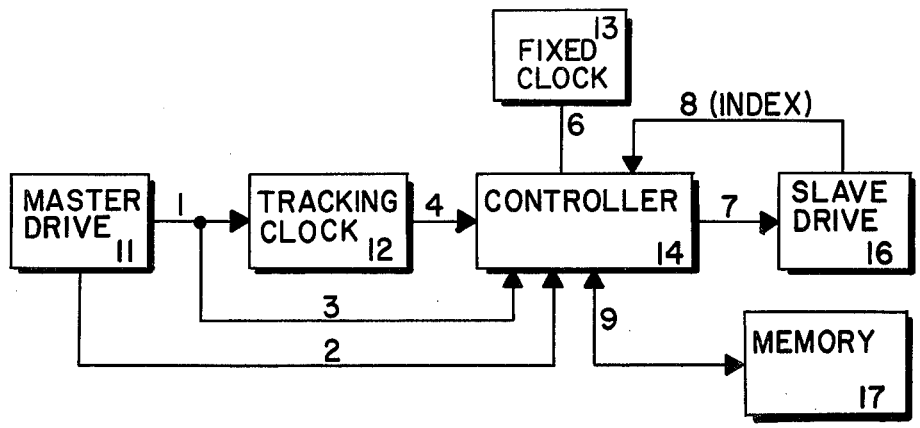
FIG. 1 is a block diagram representation of the digital data duplication system showing the copy phase of the invention.

Referring to FIG. 1 where it is shown by block diagram representation, the principal components of the Universal Digital Data Duplication System, the system is depicted generally in FIG. 1. The main components include a master drive 11, a tracking clock 12, controller 14, fixed clock 13, memory 17 and slave drive 16. Connecting the master drive to the tracking clock is data line 1. Data from the master drive is also routed through data line 3 directly to the controller. Line 2, connecting the master drive to the controller provides the drive index line. Master drive 11 is comprised of a drive unit and a read head. Tracking clock 12 is connected to controller 14 by line 4 and fixed clock 13 is connected to controller by line 6. Memory 17 is connected to controller by line 9 and slave drive 16 is connected to controller by line 7 and line 8. Line 7 is the data line. Line 8 is the index line.

The operation of the device as depicted in FIG. 1 will now be explained. Digital information is read from the media to be copied at master drive 11. That information is transferred along line 1 to tracking clock 12 which can be any tracking clock, but it is found that a phase lock oscillator (PLO) is the best mode. The tracking clock 12 locks on to the base frequency of the data being read from the master drive and establishes PLO cell intervals equal to some multiple of that base frequency. The PLO output is then routed through line 4 to controller 14. Information read from master drive 11, routed through line 3, into controller 14 is in the form of pulses representing media flux reversals. Those pulses are established as to whether or not they occur within the PLO cell as defined by tracking clock 12. Thus, the information read from master drive 11 established in PLO cell intervals by the use of tracking clock 12 is briefly stored in buffer memory 17 through line 9. The presence of a pulse in a PLO cell is stored in buffer memory as a "1" bit and the absence of a pulse as an "0" bit. In order to write the information onto slave drive 16, it is necessary to provide fixed clock pulses from fixed clock 13 through line 6 to controller 14. The controller takes the original pulse information from buffer memory 17 through line 9 in the same sequence the information was read from the master and sends it to the slave drive 16 through line 7 at a fixed clock rate equal to the PLO cell interval established from the information coming from master drive 11. The starting index which may be an optical index as used in flexible discs or any other index signal, is routed from master drive 11 when received to controller 14. The information to be written on the media at slave drive 16 is timed so that it begins when the index from slave drive 16 is activated at controller 14. Thus, the device in FIG. 1 copies the information being read at master drive 11 onto slave drive 16 regardless of format or encoding scheme.

The embodiment as shown in FIG. 1 can be further improved upon by the addition of a verifier circuit. Such a device is depicted in FIG. 2 by block diagram representation.

In FIG. 2, the device includes master drive 11 connected directly to serial to parallel converter 19 which is, in turn, connected to controller 21. Phase lock oscillator (PLO) 18 is activated by the data received on line 28 by way of line 29 connecting PLO 18 to master drive 11. PLO 18 is, in turn, connected to serial to parallel converter by line 31. Information which has thus been placed in PLO cells by use of the tracking clock comprised of PLO are sent to the serial to parallel converter 19 via line 31 and are routed in parallel form through line 32 to controller 21 where they are stored in buffer memory 17. When controller 21 receives the index signal from slave drive 16, the information in parallel form is fed through line 34 to a parallel to serial converter 26 where fixed clock 27 is delivering fixed clock pulses continuously through line 42; thus, allowing the flux reversals corresponding to buffer memory bits to be placed in fixed clock cells in the same relationship that they were read from master drive 11 and then fed through line 41 to slave drive 16 where the information is written on the copy disc. Immediately after the information is written on copy disc at slave drive 16, it is read back and PLO clocked through serial to parallel converter 24 and PLO 23 using lines 37, 38 and 39, so that the information at the output of serial to parallel converter 24 at line 36 is fed to 8 bit comparator 22 for verification. The information that was previously read from master drive 11, written on slave drive 16 and stored in memory 17 is still stored in memory 17 and is then compared to information received at line 36 at the 8 bit comparator. If the information read from the slave is the same as that previously stored in memory, the verification is complete. Thus, verifier 44 insures that data read from master drive 11 is the same data that is written at slave drive 16. Initial clocking and serial to parallel conversion in 43 is similar to the clocking and serial to parallel conversion used in verifier 44. The circuit in dashed lines 46 provides fixed clock intervals for writing data onto slave drive 16.

Figure 3:
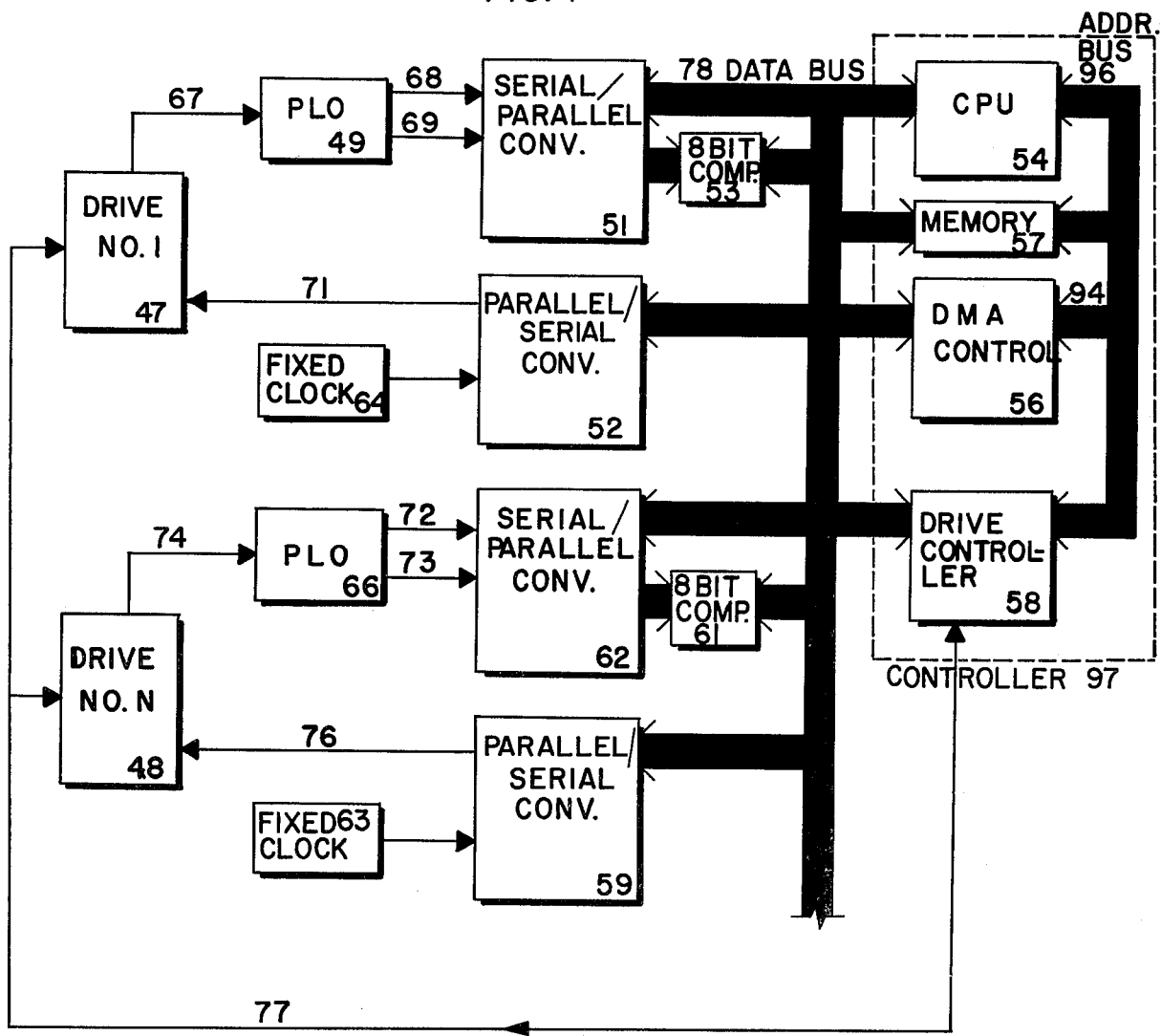
FIG. 3 is a block diagram representation of the digital data duplication system in which a plurality of drive units are employed to make multiple copies concurrently from one master.

It can be shown that any number of drive units could be connected, so that from a single master copy, any number of duplicate copies could be produced and that any drive could act as the master. Referring now to FIG. 3 where it is shown that by the use of multiple drives connected by the address buss 96 and data buss 78, the data being read from drive number 1 can be written on any drive as shown in drive number "N" 48 in the same manner as depicted in FIG. 2. The size of the buffer memory 57 is not dependent on the number of additional slave drive units used. The Drive Controller 58, direct memory access (DMA) control 56 and central processing unit (CPU) 54 in FIG. 3 are integral parts of controllers 14, 21, 97 in FIGS. 1, 2, and 3 respectively, and represent the preferred method of memory access and drive control commonly used.

Figure 4:
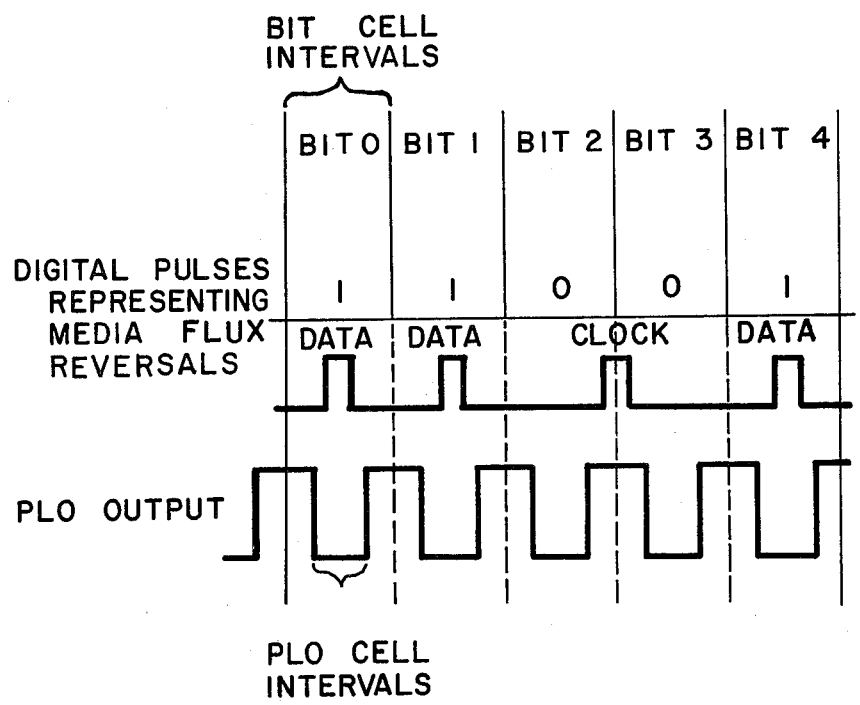
FIG. 4 is a timing diagram representing common encoding schemes in use with flexible disc media.

Referring now to FIG. 4 which illustrates the commonly used MFM encoding scheme where a flux reversal within a set cell interval defines logical "1" data bit and the lack thereof defines a logical "0" data bit. Clock bits are required between successive "0" bits and must also be copied. The PLO locks on to the base frequency of this read data and outputs a multiple of that base frequency. The PLO operating frequencies are thereby automatically increased or decreased to accomodate any recording scheme. If the PLO output frequency is a multiple of the read data base frequency, such as shown in FIG. 4, all data and clock pulses will be "caught" within PLO cell intervals and then recorded at the slave drive by use of the appropriate fixed clock frequency. Actually, the copy thus produced will be at least as precise as the original.

Although specific components, circuits and steps have been stated in the above description of the preferred embodiments of the invention, other components, circuits and steps may be used with satisfactory results in varying degrees of quality. In addition, it will be understood that various other changes of the details, materials, steps, arrangement of parts and uses which have been herein described and illustrated in order to explain the nature of the invention will occur to and may be made by those skilled in the art, upon a reading of the disclosure, and such changes are intended to be included within the principles and scope of this invention as hereinafter claimed.

We claim:

1. A digital data duplication system for the blind copying of digital data from a master onto a slave, comprising, a master drive means operative to read the digital data from a master, a slave drive means operative to record onto a slave the digital data read from the master, a controller operatively electronically connected between said master drive means and slave drive means, an electronic tracking clock electronically connected to the controller and operative to establish as an output to the controller cell intervals determined as a function of the base frequency of the data being read by the master drive means, said controller being operative to receive read data from the master drive means and to establish that data in the cell intervals defined by the tracking clock, a buffer memory operatively connected to the controller for briefly storing the read data established in cell intervals, and a fixed clock operative to provide fixed clock pulses to the controller at a fixed clock rate, said controller being operative to transmit the read data from the buffer memory to the slave drive means at said fixed clock rate.

2. The digital data duplication system of claim 1 wherein said tracking clock comprises a phase lock oscillator.

3. The digital data duplication system of claim 1 wherein said tracking clock is operative to lock onto the base frequency of the data being read by the master drive means whereby said tracking clock is operatively governed by the read data itself.

4. The digital data duplication system of claim 1 wherein said fixed clock rate is equal to the cell intervals established by the tracking clock.

5. The digital data duplication system of claim 1 further comprising a data verification means for detecting errors in information recorded at said slave drive means.

6. The digital data duplication system of claim 1 further comprising multiple slave drive means with interchangeable master and slave designation.

* * * * *